May 4, 1971  P. H. GIFFORD II  3,577,338
PROCESS FOR RECOVERY OF OIL FROM OIL SHALE SIMULTANEOUSLY
PRODUCING HYDROGEN
Filed Feb. 19, 1969
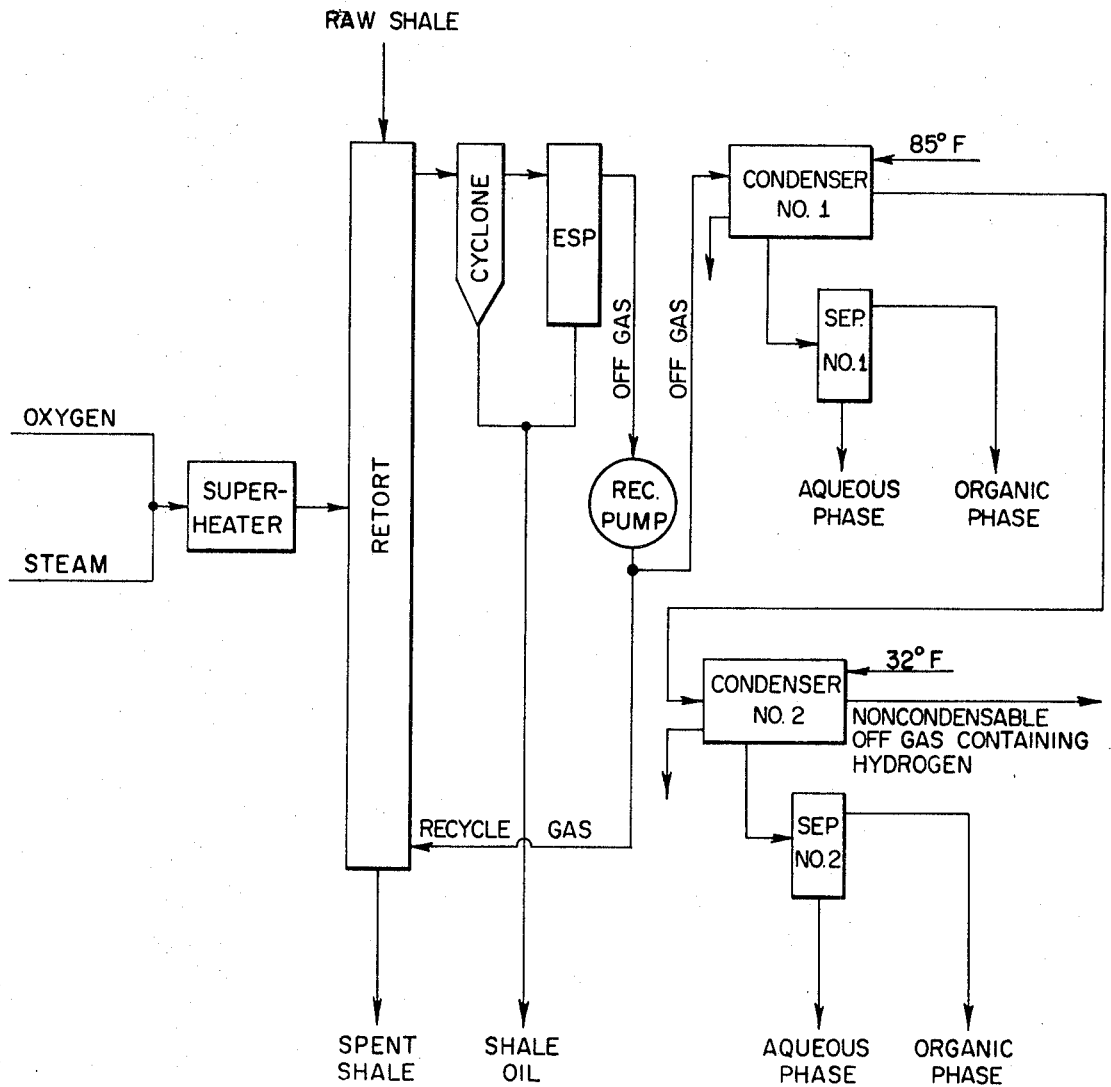
ESP — ELECTROSTATIC PRECIPITATOR
SEP — SEPARATOR
INVENTOR.
PHILLIP H. GIFFORD II
BY
*Sheridan and Ross*
ATTORNEYS

United States Patent Office 3,577,338
Patented May 4, 1971

3,577,338
PROCESS FOR RECOVERY OF OIL FROM OIL SHALE SIMULTANEOUSLY PRODUCING HYDROGEN
Phillip H. Gifford II, Carbondale, Colo.
(1824 K 4/10 Road, Fruita, Colo. 81521)
Filed Feb. 19, 1969, Ser. No. 800,594
Int. Cl. C10b 53/06
U.S. Cl. 208—11
11 Claims

ABSTRACT OF THE DISCLOSURE

A process for retorting oil shale and simultaneously producing hydrogen as a by-product with high yields of both oil and hydrogen, the process comprising continuously passing oil shale through a combustion zone in a retort while continuously introducing steam and oxygen into the combustion zone, removing spent shale below the combustion zone and recovering oil and hydrogen from the retort off gas from the combustion zone. Hydrogen is produced by the reaction of carbon containing material with steam.

SUMMARY OF THE INVENTION

This invention relates a method of recovering oil from oil shale and producing hydrogen as a by-product, more particularly, it relates to a method for recovering oil from oil shale and simultaneously producing hydrogen.

A process which produces hydrogen in significant amounts in addition to recovering the oil at a high yield from the oil shale has a much better commercial feasibility than any existing process. Although small amounts of hydrogen are produced by the prior art processes, these processes did not produce hydrogen in significant amounts because they were not designed to promote the reaction of steam with the residual carbon on the spent shale; this carbon is discarded with the waste spent shale. Also no attempt is made to recover even the small amount of hydrogen produced.

In accordance with the closest prior art process, Gas Combustion, of recovering oil from oil shale, oil shale is introduced into the top of a vertical retort into a combustion zone where air is introduced to retort the oil shale. After retorting, the spent shale passes by gravity out the bottom of the retort and the mixture of gases formed by the reactions passes out the retort above the combustion zone. The mixture of gases includes oil mist, nitrogen, carbon dioxide, carbon monoxide, hydrogen, and some hydrocarbons. The oil mist is separated by a cyclone and an electrostatic precipitator from the gases and recovered as shale oil. No attempt is made either to recover the small amount of hydrogen in the off gas or to utilize the organic carbon deposited on the waste spent shale. This process as practiced heretofore is very objectionable because of poor operability. The poor operability is caused by the formation of large clinkers in the retort. These clinkers are formed when the gravity flow of the shale stops, and this flow stops because of the formation of a zone in the retort whose composition is such as to make it possible for the shale to bridge across large sections of the bed. Once shale stops moving, even for a short period of time, it becomes very hot and a clinker is produced.

Various expedients have been used to overcome the above mentioned disadvantages, most of them mechanical in nature. An example of this is the prior art process known as the Tosco Process. The invention set forth herein is a chemical solution to the problem of clinker formation.

The invention comprises the use of a mixture of steam and oxygen for retorting the oil shale in the retort. Oxygen is introduced to supply most of the energy required to run the process. The percentage composition of the mixture of oxygen and steam may be varied within rather broad limits without affecting operability.

The practice of the invention will now be described with reference to the accompanying drawing and the examples and description which follow.

The drawing is a flow diagram schematically representing the equipment used in conventional oil shale retorting procedures, and in which the process of this invention would typically be practiced.

Oxygen and steam are continuously introduced into the vertical retort through which raw shale travels continuously downward by gravity. If necessary a superheater may be used as shown. The combustion zone is at the point of introduction of the steam and oxygen. Spent shale is removed from the bottom of the retort. The gases and shale oil mist pass out of the retort at the top as shown. The mixture of gases and shale oil mist passes through a cyclone and an electrostatic precipitator for the separation and recovery of the shale oil. The retort off gas is then divided with a part of it being recycled to the bottom of the retort for the purpose of recovering heat from the hot spent shale. The remainder of the retort off gas is passed through a series of condensers to remove condensable liquids. The gas from these condensers, called the non-condensable off gas, is then fed to a conventional hydrogen recovery process.

As used herein and in the claims the term "oil shale product" means either raw or spent shale.

EXAMPLE 1

A reactor was filled with about 1.6 pounds of raw shale analyzing about 30 gallons of oil per ton of rock (Fischer Assay). Superheated steam at a temperature around 1000° F. was fed into the reactor at a rate of 1 s.c.f.m. (standard cubic feet per minute) to preheat the shale; this was also the temperature and rate during the run. After preheating, oxygen was introduced at a rate of 0.105 s.c.f.m. until oxygen breakthrough occurred. The reactor was then allowed to cool, then was opened, and the spent shale inspected.

During the run the off gas was tested every five to ten minutes for the presence of hydrogen. Hydrogen appeared in every run immediately upon the introduction of oxygen. The off gas burned with a violent, almost invisible, blue flame; as opposed to a yellow-orange smoky flame which was obtained during the preheat or from off gases from the prior art processes. The recovery of oil from the shale was from 80 to 90 percent FA (Fischer Assay), that is, 80 to 90 percent of the oil present in the shale was recovered. The examination of the spent shale revealed that it was very light in appearance; this is directly opposite from what was found in conventional oil shale processes—there, the spent shale is almost black. It was evident that a carbon consuming reaction, after completely removing all external carbon, had penetrated by diffusion deep into the particles. The spent shale was completely retorted, and there was no evidence of sintering. It was apparent that hydrogen had been produced in significant amounts by the reaction of carbon with the steam which was introduced. As all of the carbon on the outside of the particles and most of the carbon inside the particles had been consumed and since there was no sintering of the particles, it was apparent that clinkering could not have occurred. There was no binder left to cohere the particles together to form the necessary bridge. The carbonate decomposition seemed to be about the same as experienced in the prior art process—Gas Combustion. This was determined by a comparison of the structural strength of the spent shale produced by either process.

EXAMPLE 2

The purpose of this run was to determine the effectiveness of the process on rich shale. With all prior art processes it is difficult to process oil shale having a Fischer Assay above 30 gallons per ton, and none of them can process shale of a Fischer Assay above 40 gallons per ton.

About 1.6 pounds of raw shale having a Fischer Assay of about 50 gallons per ton of rock was introduced into the reactor. Steam and oxygen were introduced into the reactor in accordance with the procedure used in Example 1. The oxygen was fed until oxygen breakthrough occurred; the reactor was allowed to cool, and when opened, the spent shale was observed again to be very light in color. The shale was completely retorted; there was no evidence of sintering, and all of the carbon had been chemically removed; in other words, the spent shale was very flowable.

The tests for hydrogen indicated that about twice as much of this gas was produced as in Example 1, and it had a high purity. The recovery of oil from the shale was approximately 80 to 90 percent FA.

Examination of the spent shale showed that all of the carbon, external and internal, had been reacted, and there was no evidence of sintering of the particles even though, in this example, the reactor reached a higher temperature than normal. Most of the spent shale particles were friable as would be expected with rich spent shale because of the lower percentage of carbonates present in rich shale. Again, since all of the external and internal carbon on the particles had been completely reacted, and there was no evidence of sintering, it would be impossible for them to cohere, to bridge across large sections, and ultimately to clinker.

The process is effective in processing oil shale of widely varying Fischer Assay. Also, since relatively small particle size shale was used in these experiments and since this is the most difficult to process, the particle size range may vary over broad limits without affecting operability of the process. Ideally, the rate of introduction of steam and oxygen is coordinated with the rate of introduction and richness of the raw shale being processed.

The mixture of steam and oxygen supplies the necessary energy and reactants for the chemical reactions occurring inside the retort. Superheated steam may be used. The composition, temperature, and rate of introduction of this mixture may vary over rather broad limits depending upon the rate of introduction of raw shale, its size range, its richness, and the desired hydrogen production rate. The above mentioned process variables will depend on the desired objectives; however, the preferred ranges are: temperature from ambient to 2000° F.; amount of oxygen in the steam-oxygen mixture from 1–50 percent; rate of introduction of the steam-oxygen mixture from 500 to 50,000 standard cubic feet of gas mixture per ton of rock. The two streams must be coordinated such that all of the oil is retorted and a maximum amount of hydrogen is produced. In the examples given above all of the oil was retorted and a relatively large amount of hydrogen was produced. The yield of hydrogen can be increased under certain conditions by the addition of more available carbon to the reaction mixture.

In this process invention using steam and oxygen there are four possible groups of chemical reactions which are of interest.

The first group consists of the oxidation or burning reactions. Here carbon and carbon containing compounds join with the oxygen to release most of the energy required to run the process. Because of the catalytic effect by the shale on this group of reactions, and because of the high activation energies of the possible gas phase reactions little or no oxygen reacts with the upcoming recycle gas. Since only a limited amount of oxygen is fed relative to the amount of external carbon available, only a portion of the external carbon on the spent shale is removed by this reaction.

The second group of reactions which occur in this process is the endothermic water reforming reactions. Examples of this group are:

$$C + H_2O = CO + H_2$$

$$C + 2H_2O = CO_2 + 2H_2$$

$$CO + H_2O = CO_2 + H_2$$

When these reactions occur in the retort two very desirable results are obtained. First of all, hydrogen is produced, and secondly carbon is consumed. A comparison of the spent shales from this process with that from Gas Combustion leads one to the conclusion that diffusion of the water molecule into the shale particle is much faster than diffusion of oxygen. The Gas Combustion spent shale exhibited a phenomenon which was the result of oxygen diffusion rate controlled burning, and on those few particles which exhibited this phenomenon the depth of penetration was always very slight, while in this process the depth of penetration of the carbon consuming reaction was to the center of the particle in most cases.

It was also apparent that as a result of certain observations and facts, there is a catalytic effect by the shale on the water reforming reactions. The data which are available to support the idea of a catalytic effect are the fact that the reforming reactions are normally conducted at around 1000° C. (1830° F.) where the literature states—"The production of water gas is carried out by the reaction of steam with incandescent coke or coal at a temperature around 1000° C. and higher where the rate and equilibrium are favorable." In opposition to this it is known that the carbonate decomposition reaction has a high rate of reaction, around 1200° F. to 1500° F., but it was observed: (1) only about 30 percent carbonate decomposition occurred, (2) a relatively large amount of hydrogen was produced, (3) the reactor walls never exceeded 1000° F., and (4) a carbon consuming reaction occurring by diffusion penetrates deep into the particles. As was mentioned earlier, diffusion of oxygen into the particle is slow, and not enough oxygen is fed to consume even all of the external carbon.

It is obvious from the above results that the presence of shale, raw or spent, catalyzes the hydrogen producing reactions. Thus, shale in the process of retorting or having been retorted can be used profitably for the production of hydrogen even though the oil has been removed. Further, the production of hydrogen in this oil shale retorting process can be enhanced by the addition of even more external available carbon than what normally exists in the raw shale. In the examples given, it is believed that hydrogen production stopped because all external and internal carbon had been reacted; if more had been present more hydrogen would have been produced. Thus, spent shale from either this process or other prior art processes is useful as a catalyst for the water reforming reactions.

The third group of chemical reactions of interest is the endothermic decomposition of the kerogen. This reaction, or reactions, produces the desired shale oil and is so complex that very little is known about it.

The fourth reaction of interest is the decomposition of the carbonates present in the shale. This reaction is endothermic and its products are the gas, carbon dioxide, and the oxides of the carbonates. Since it is endothermic it represents an absorption of heat energy, and it is entirely possible that this reaction or its effects or products enhances the catalytic effect for water reforming.

A further advantage of this process is the balance between the possible exothermic and endothermic reactions. This balance has the effect of buffering the temperature in the combustion zone at the desired level. In one run an attempt was made to sinter the shale by feeding the excess of oxygen. The attempt was unsuccessful, but it was noted that more than usual hydrogen was produced; thus, when the temperature gets too high the endothermic reactions gain speed and cool the combustion zone. The idea is similar to the idea of a buffered solution in which the pH is controlled within certain limits.

Although oxygen can be introduced in air, an advantage of using oxygen over air is that in the recovery of hydrogen from the noncondensable off gases one does not have the nitrogen of the air to contend with. If a cheap process could be devised to separate hydrogen from nitrogen, air might be feasibly used.

One can see from the possible reactions that oxygen and water are competing for the available external carbon. This competition is controlled by the amount of oxygen fed to the process; just enough is fed to provide the energy required to run the process, and since stoichiometrically there is much more external carbon present than what the limited amount of oxygen fed can consume, the remainder of the external carbon and all of the internal carbon is left for the water to consume.

The invention provides an improved oil shale retorting process in which high yields of shale oil are obtained and significant amounts of hydrogen are produced, and substantially no clinkering or sintering of the shale can occur. These advantages support its economic feasibility. The process has the further advantage in that the recovery of the hydrogen from the noncondensable off gas can be accomplished in a known commercial process. Other advantages of the process will be obvious to those skilled in the art.

I claim:

1. A process for recovering oil from oil shale which comprises: continuously feeding oil shale into the top of a vertical retort; introducing into the retort at a point below the point of introduction of the shale a first mixture of steam and oxygen; removing spent shale from the bottom of the retort; removing from the retort a second mixture of gases and shale oil mist formed by retorting the oil shale in the retort; separating oil from said second mixture; and recovering hydrogen from the gases in said second mixture.

2. The process of claim 1 in which oxygen is introduced in a mixture of gases.

3. The process of claim 1 in which said first mixture is introduced into the retort in at least a rate and in an amount sufficient to retort all of the oil shale introduced into the retort at the rate it is being introduced.

4. The process of claim 1 in which available carbon is added to the reaction mixture in the retort.

5. The process of claim 1 in which the steam is superheated steam.

6. The process of claim 1 in which the mixture of steam and oxygen includes from 1 percent to 50 percent oxygen, the temperature of said first mixture varies from ambient to 2000° F., and the rate of introduction of said first mixture is from 500 to 50,000 standard cubic feet of gas mixture per ton of rock.

7. The process of claim 1 in which said first mixture is introduced into the retort at a rate sufficient to produce the desired amount of hydrogen.

8. In the process of producing oil from oil shale and producing hydrogen as a by-product in which steam is added to the oil shale, the improvement which comprises adding oxygen along with the steam.

9. A process for recovering oil from oil shale and producing hydrogen which comprises: continuously feeding oil shale into a combustion zone in a retort at a given rate; adding to the shale in the combustion zone a mixture of steam and oxygen at a rate to completely retort all of the oil shale passing through the combustion zone whereby endothermic reactions between carbon and water are catalyzed to chemically remove substantially all of the carbon from the shale particles, whereby clinkering in the combustion zone is prevented and continuous flow of shale and spent shale is maintained through the retort; permitting spent shale to leave the combustion zone by gravity flow; permitting gases to escape above the combustion zone; separating oil from said gases; and separating and recovering hydrogen from said gases formed.

10. In the process of producing hydrogen by the reaction of carbon and water in the presence of heat, the improvement which comprises catalyzing the reaction by the addition of an oil shale product.

11. The process of claim 10 in which said product is spent shale.

References Cited

UNITED STATES PATENTS

| | | | |
|---|---|---|---|
| 2,847,306 | 8/1958 | Stewart et al. | 208—11 |
| 3,130,132 | 4/1964 | Sanders | 201—36 |
| 3,463,623 | 8/1969 | Forney et al. | 201—38 |

CURTIS R. DAVIS, Primary Examiner

U.S. Cl. X.R.

201—38